United States Patent
Seo et al.

(10) Patent No.: US 6,873,774 B2
(45) Date of Patent: Mar. 29, 2005

(54) TRANSMISSION OPTICAL FIBER

(75) Inventors: Hong-Seok Seo, Daejon-Shi (KR);
Yong Gyu Choi, Daejon-Shi (KR);
Kyong Hon Kim, Daejon-Shi (KR)

(73) Assignee: Electronics and Telecommunication Research Institute, Daejon-Shi (KR)

( * ) Notice: Subject to any disclaimer, the term of this patent is extended or adjusted under 35 U.S.C. 154(b) by 122 days.

(21) Appl. No.: 10/329,544

(22) Filed: Dec. 27, 2002

(65) Prior Publication Data

US 2004/0071418 A1 Apr. 15, 2004

(30) Foreign Application Priority Data

Oct. 10, 2002 (KR) .............................. 10-2002-0061670

(51) Int. Cl.[7] .................................................. G02B 6/16
(52) U.S. Cl. ..................................... 385/123; 385/126
(58) Field of Search ................................ 385/123–128; 65/398

(56) References Cited

U.S. PATENT DOCUMENTS

| | | | |
|---|---|---|---|
| 4,822,399 A | * | 4/1989 | Kanamori et al. ............ 65/398 |
| 5,673,354 A | * | 9/1997 | Akasaka et al. ............ 385/127 |
| 6,044,191 A | | 3/2000 | Berkey et al. ............... 385/123 |
| 6,147,794 A | | 11/2000 | Stentz ........................ 359/334 |

FOREIGN PATENT DOCUMENTS

JP    11237514    8/1999    ............ G02B/6/10

OTHER PUBLICATIONS

R. Hainberger, et al.; Optimum span configuration of Raman–amplified dispersion–managed fibers; 2000 Optical Society of America; pp. 1–3.

* cited by examiner

*Primary Examiner*—Phan T. H. Palmer
(74) *Attorney, Agent, or Firm*—Mayer, Brown, Rowe & Maw LLP

(57) ABSTRACT

The present invention relates to a transmission optical fiber. The transmission optical fiber including a core and a cladding made of $SiO_2$ is characterized in that $GeO_2$ and F are doped in $SiO_2$ of the core and the cladding. Therefore, a high Raman gain coefficient could be obtained while a desired dispersion value and a non-linearity are maintained, by controlling the refractive index of the core and the cladding. Further, the pump power of the laser diode could be reduced and the cost of the laser diode could be lowered accordingly. In addition, the life of the laser diode is extended since the laser diode needs not to be operated at a high output.

5 Claims, 4 Drawing Sheets

FIG. 1A
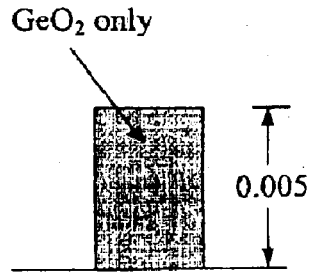
FIG. 1B
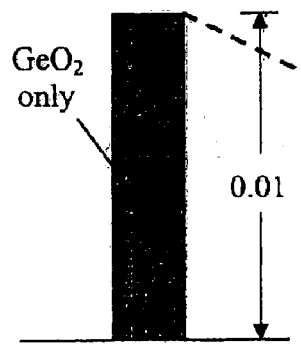
FIG. 1C
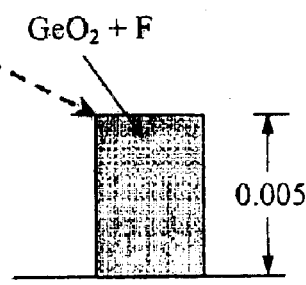
FIG. 2
| | A | B | C |
|---|---|---|---|
| GeO2 Mol % | 3.2 | 6.45 | 6.45 |
| N.A. | 0.12 | 0.17 | 0.12 |
| Raman Gain efficiency | 0.621 [1/W/km] | 1.6 [1/W/km] | 0.756 [1/W/km] |
| Nonliner coefficient | 1.219 [1/W/km] | 2.69 [1/W/km] | 1.272 [1/W/km] |
| Double Rayleigh Back Scattering | 5.712 [$10^{-5}$/km] | 15.32 [$10^{-5}$/km] | 5.712 [$10^{-5}$/km] |

TRANSMISSION OPTICAL FIBER

BACKGROUND OF THE INVENTION

1. Field of the Invention

The invention relates generally to a transmission optical fiber used in optical communication systems, and more particularly to, a transmission optical fiber capable of maintaining an existing dispersion characteristic and also increasing the Raman optical gain with a wide effective cross section.

2. Description of the Prior Art

Optical communication is a communication method by which information is received and transmitted using light. In optical communication, an optical fiber transmission line is used as a transmission medium, a semiconductor laser or a light emitting diode is used as the light source, an optical detector is used as a light-receiving unit, and the like. The optical fiber has a dual cylindrical shape in which a core at the central portion is surrounded by a cladding portion. As the refractive index of the core portion is higher than the cladding portion, light is focused on the core portion and proceeds along the optical fiber. Normally, the one in which the diameter of the core is several $\mu$m is called "a single mode optical fiber", and the one in which the diameter of the core is several dozens of $\mu$m is called "a multi-mode optical fiber". The optical fiber is classified into a step type optical fiber, a slope type optical fiber, etc. depending on dispersion of the refractive index of the core. Generally, the core of the optical fiber has a stricture in which $GeO_2$ is doped in $SiO_2$, and the cladding of the optical fiber uses $SiO_2$ intact or has a structure in which $P_2O_5$ and fluorine (F) are doped in $SiO_2$.

The transmission optical fiber that is usually used in the optical communication system includes a standard single mode fiber, a dispersion managed fiber, a dispersion shifted fiber, a non-zero dispersion shifted fiber, and the like. These transmission optical fibers show different characteristics since they mainly represent a dispersion characteristic and a non-linear phenomenon. The standard single mode fiber that is most widely used as the transmission optical fiber has the difference in the refractive index of 0.004~5 between the core and the cladding. Also, the standard single mode fiber has a zero dispersion characteristic at a 1.3 $\mu$m wavelength and has a value of about 17 ps/nm/km at a 1.55 $\mu$m wavelength. Further, the peak Raman gain efficiency of the standard signal mode fiber is about 0.34 $W^{-1}km^{-1}$. For reference, the Raman optical fiber for a lumped type Raman optical amplifier has a high peak Raman gain efficiency of about 6.5 $W^{-1}km^{-1}$. This is because the Raman gain is increased by adding a lot of $GeO_2$ to the core, the refractive index of the core is increased by $GeO_2$ and the effective cross section is reduced by reducing the radius of the core in order to satisfy a single mode condition, so that the ratio of the area against the light power that is obtained within the optical fiber is increased.

In case of DCF (dispersion compensating fiber, index difference=0.026), the peak Raman gain efficiency is about 3.12 $W^{-1}km^{-1}$. As the core radius is small and the refractive index of the core is high, the Raman gain efficiency is increased. In case of NZDSF (non-zero dispersion shifted fiber), a place where the dispersion value reaches zero is approximately a S-band region, and the dispersion value is low at a C-band region. Therefore, the NZDSF has a better characteristic than the standard single mode optical fiber in the optical transmission system using the C-band. The NZDSF has the peak Raman gain efficiency of 0.7 $W^{-1}km^{-1}$.

Of other transmission optical fibers, DSF has the peak Raman gain efficiency of 0.66 and LEAF(Large effective area fiber) from the Coning company has the peak Raman gain efficiency of about 0.45 $W^{-1}km^{-1}$ in addition to other dispersion characteristics. Items to be greatly consider in designing the transmission optical fiber include maintaining a low non-linearity, low optical loss, and large effective cross section area, low dispersion characteristic, and the like. The dispersion managed fiber is an optical fiber that serves to remove the forward mixing generating upon transmission at a low dispersion region and make zero the average dispersion value felt by the signal upon transmission, in view of the dispersion characteristic. U.S. Pat. No. 6,044,191 entitled "Dispersion Managed Optical Waveguide" discloses a method by which an average dispersion is approximated to zero by varying the dispersion value form an positive value to a negative value depending on the length of the optical fiber and then periodically varying the diameter of the core in the optical fiber to perform dispersion management.

As the transmission optical fiber has a low refractive index of the core and a high effective cross section in view of the peak Raman gain efficiency, the non-linear coefficient value is very low and the Raman gain is very low. Therefore, a method by which $GeO_2$ is added to the core has been conventionally used in order to increase the Raman gain. An increase in the refractive index of the core accompanies a decrease in the diameter of the core in order to match a single mode condition. However, this significantly increases the non-linear characteristic of the optical fiber, and largely changes the dispersion characteristic of the transmission medium. Further, as an increase in the refractive index of the core makes the numerical aperture bigger, a double Rayleigh back scattering coefficient is also increased. The light induced by the DRBS is intact amplified in the Raman pumped optical fiber and then reaches the receiving unit, so that the signal sensitivity is degraded. Therefore, an increase in the refractive index coefficient of the core in the transmission medium causes various other phenomena, which make obsolete the value as the transmission medium.

SUMMARY OF THE INVENTION

The present invention is contrived to solve the above problems and an object of the present invention is to provide a transmission optical fiber that can increase a Raman optical gain and can maintain an existing dispersion characteristic, a non-linear characteristic and a Rayleigh back scattering value, with a wide effective cross section.

In order to accomplish the above object, the transmission optical fiber including a core and a cladding made of $SiO_2$ according to the present invention, is characterized in that $GeO_2$ and F are doped in $SiO_2$ of the core and the cladding.

It is preferred that $GeO_2$ of 3.0~10 mol % and F of 0.1~5 mol % are doped in $SiO_2$ of the core. Also, it is preferred that $GeO_2$ of 0.1~3 mol % and F of 0.05~1.5 mol % are doped in $SiO_2$ of the cladding.

BRIEF DESCRIPTION OF THE DRAWINGS

The aforementioned aspects and other features of the present invention will be explained in the following description, taken in conjunction with the accompanying drawings, wherein:

FIG. 1A~FIG. 1C are drawings for comparing respective characteristics of the optical fibers having step-type refraction dispersion when $GeO_2$ and F are added to the optical fiber;

FIG. 2 is tables for describing the numerical aperture (NA), Raman gain, non-linear coefficient and a double Rayleigh back scattering coefficient for respective cases of FIG. 1A~FIG. 1C;

DETAILED DESCRIPTION OF PREFERRED EMBODIMENTS

Figure 3:
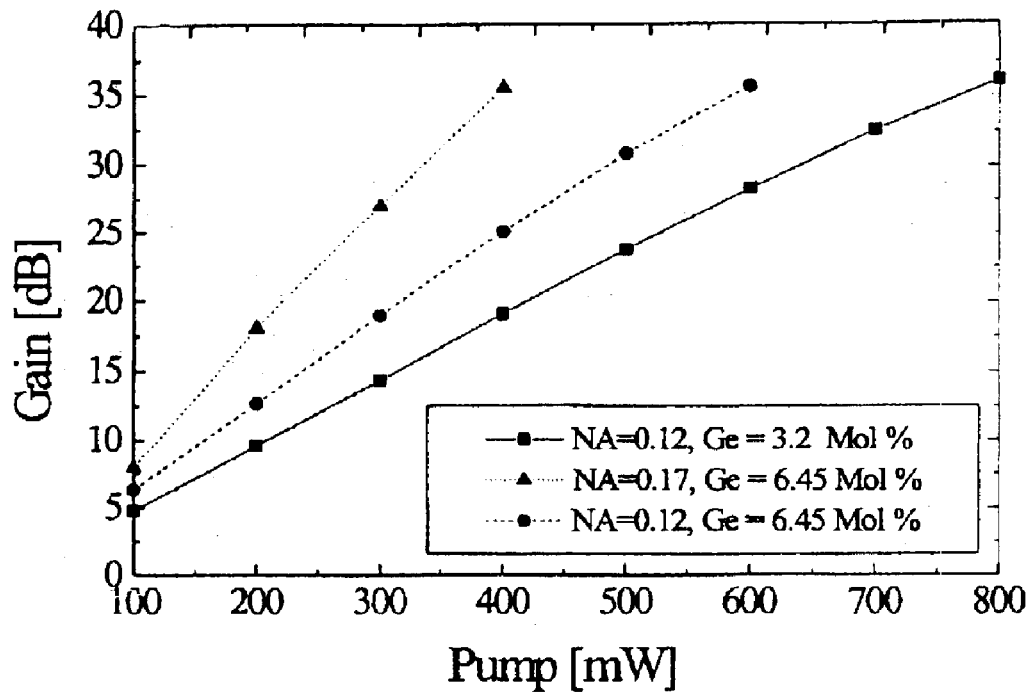
FIG. 3 is a graph of the Raman gain against the pump power for respective cases of FIG. 1A~FIG. 1C.

The present invention will be described in detail by way of a preferred embodiment with reference to accompanying drawings.

The present invention is characterized in that fluorine (F) is doped to the core or the cladding while $GeO_2$ is added to them, in order to design a transmission optical fiber capable of obtaining a high Raman gain coefficient and reducing double Rayleigh back scattering and non-linearity. Therefore, an increase in the refractive index by $GeO_2$ is reduced and the concentration of $GeO_2$ in the core can be fabricated higher, so that the Raman optical gain is increased. At this time, it is preferred that the range of the concentration of $GeO_2$ in the core is in range of 3.0~10 mol %, and the concentration of fluorine is in range of 0.1~5 mol %. It is characterized in that the range of the refractive index of the core is kept higher by the range of 0.003~0.015 than pure $SiO_2$. The refractive index is increase by controlling $GeO_2$. At this time, the entire refractive index is controlled by adding F. Further, it is preferred that the range of the concentration of $GeO_2$ in the cladding is in range of 0.1~3 mol % and the range of the concentration of fluorine is in range of 0.05~1.5 mol %. The refractive index of the cladding is designed to have a range lower by 0.0~0.003 than pure $SiO_2$.

The transmission optical fiber constructed above could be used in the standard single mode optical fiber, the dispersion managed fiber, the non-zero dispersion shifted fiber, and the like. The transmission optical fiber constructed above could also be used in the optical fiber amplification system of a distributed Raman amplifier structure.

Optical fibers of the three kinds will be compared below in order to show that an optical fiber having a good Raman gain, a small non-linearity and a low Rayleigh back scattering value by adding $GeO_2$ and F together to the core could be adequately used as the transmission medium. In this comparison, the composition of the cladding is not considered since it does not affect the Raman gain characteristic.

FIG. 1A~FIG. 1C are drawings for comparing respective characteristics of the optical fibers having the step-type refraction dispersion when $GeO_2$ and F are added to the optical fiber, and FIG. 2 is tables for describing values of the numerical aperture (NA), the Raman gain, the non-linear coefficient and the double Rayleigh back scattering coefficient for respective cases of FIG. 1A~FIG. 1C. The Raman gain represents a stimulated Raman scattering phenomenon when a high output laser light is incident to the optical fiber. This means the gain that is obtained when a signal beam at the frequency, $\omega_s$ is coincided with the pump, $\omega_p$ at the fiber input. In other words, the signal beam is amplified because of the Raman gain as long as the frequency difference $\omega_p - \omega_s$ lies within the vibration energy of the optical phonon of the given optical fiber.

FIG. 1A shows a single mode optical fiber structure in which the refractive index is raised to 0.005 by adding $GeO_2$ within the core of a silica fiber. The structure of the refractive index has simply a step type profile. It could be seen that the core has dispersion of a higher refractive index by about 0.005 than the cladding, by adding $GeO_2$ of 3.2 mol % to the silica structure in order to increase the refractive index of the core.

FIG. 1B shows a single mode optical fiber structure in which the refractive index is raised to 0.01 by adding $GeO_2$ within the core of the silica fiber. It could be seen that the core in FIG. 1B has the refractive index higher by about 0.01 than the cladding by adding $GeO_2$ of 6.45 mol % that is about twice compared FIG. 1A but the radius of the core is reduced compared to FIG. 1A for a single mode condition (cutoff wavelength-1.21 $\mu$m).

FIG. 1C shows an optical fiber structure in which the refractive index is raised to 0.01 by adding $GeO_2$ of about 6.45 mol % within the core of the silica fiber but the refractive index is lowered to 0.005 by adding fluorine of 3.2 mol %. The difference in the refractive index is about 0.005 being the standard single mode condition like FIG. 1A. When the cutoff wavelength for a single mode condition is 1.21 $\mu$m, the radius of the core is also same to FIG. 1A. The concentration of the $GeO_2$ within the core is actually 6.45 mol % like in FIG. 1B. As a result, FIG. 1A and FIG. 1C have the same refractive index and FIG. 1B and FIG. 1C have the same concentration of $GeO_2$.

The Raman gains of the three optical fibers shown in FIG. 1A~FIG. 1C are compared below. First, FIG. 1A is a standard type optical fiber and has the smallest Raman gain coefficient of 0.621 $W^{-1}km^{-1}$, the smallest nonlinear coefficient of 1.219 $W^{-1}km^{-1}$ and the very small double Rayleigh scattering value of 5.712 $10^{-5}km^{-1}$, since the concentration of $GeO_2$ is low and the effective cross section is large. FIG. 1B has the largest Raman gain coefficient of 1.6 $W^{-1}km^{-1}$, the largest nonlinear coefficient of 2.69 $W^{-1}km^{-1}$ and the largest double Rayleigh scattering value of 15.32 $10^{-5}km^{-1}$ since the numerical aperture is large, since the difference in the refractive index is high and the effective cross section is small. FIG. 1C has a Raman gain efficiency between FIG. 1A and FIG. 1B because the effective area is larger than that of FIG. 1B and the Raman gain coefficient is higher than that of FIG. 1A, even though the effective area is same as that of FIG 1C. Note that the concentration of $GeO_2$ within the core is same to FIG. 1B, and the Raman gain efficiency is lower because it is formulated by Raman gain coefficient over effective area. Also, FIG. 1C has a dispersion of the same refractive index to FIG. 1A and is significantly higher than FIG. 1A, in view of the concentration of $GeO_2$. The Raman optical gain efficiency is 0.756 $W^{-1}km^{-1}$, and the nonlinear coefficient in FIG. 1C is 1.272 $W^{-1}km^{-1}$ that is a littler greater than FIG. 1A but significantly smaller than FIG. 1B. The double Rayleigh back scattering value in FIG. 1C is 5.712 $10^{-5}km^{-1}$ that is almost same or similar to FIG. 1A. As a result, if the transmission optical fiber having a low refractive index is to be designed, it is advantageous that a structure has a high concentration of $GeO_2$ like in FIG. 1C and maintains a low refractive index, in view of the Raman optical gain.

FIG. 3 is a graph resulting from a simulation of the Raman gain against the pump power for respective cases of FIG. 1A~FIG. 1C. In FIG. 3, the cutoff wavelengths of the optical fibers are 1.21 $\mu$m, respectively, the Raman gain coefficients depending on the concentration of $GeO_2$ for respective cases are used, and the effective areas depending on the wavelength are different considering the waveguide effect. In FIG. 3, the axis of abscissa indicates the pump power value (mW) and the axis of ordinate indicates the Raman on/off gain (dB) defining the gain of the distributed Raman amplifier. The input channel is 40 channels whose entire power is 6 dBm, which shows a value at one wavelength (1.55 µm) of them.

Referring to FIG. 3, it can be seen that FIG. 1B shows a high Raman gain value even at a low power. More particularly, in FIG. 1B, about 310 mW is required in order to obtain 30 dB. In FIG. 1A, a value of over 600 mW is required in order to obtain a gain of over 30 dB. At this time, in FIG. 1B, a value of about 460 mW is required. Comparing the three optical fibers in FIG. 1A~FIG. 1C, it can be seen that the optical fiber having a higher Raman gain efficiency has a higher Raman gain.

Figure 4A:
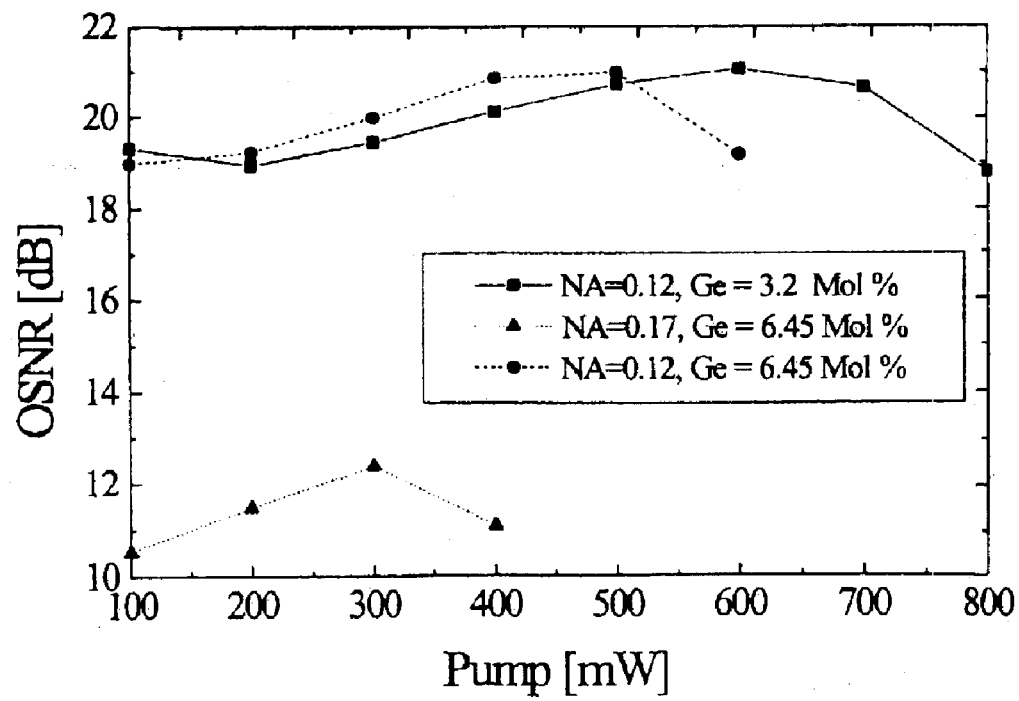
FIG. 4A and FIG. 4B are graphs illustrating results of calculating the optical signal to noise ratio (OSNR) for respective cases of FIG. 1A~FIG. 1C.
Figure 4B:
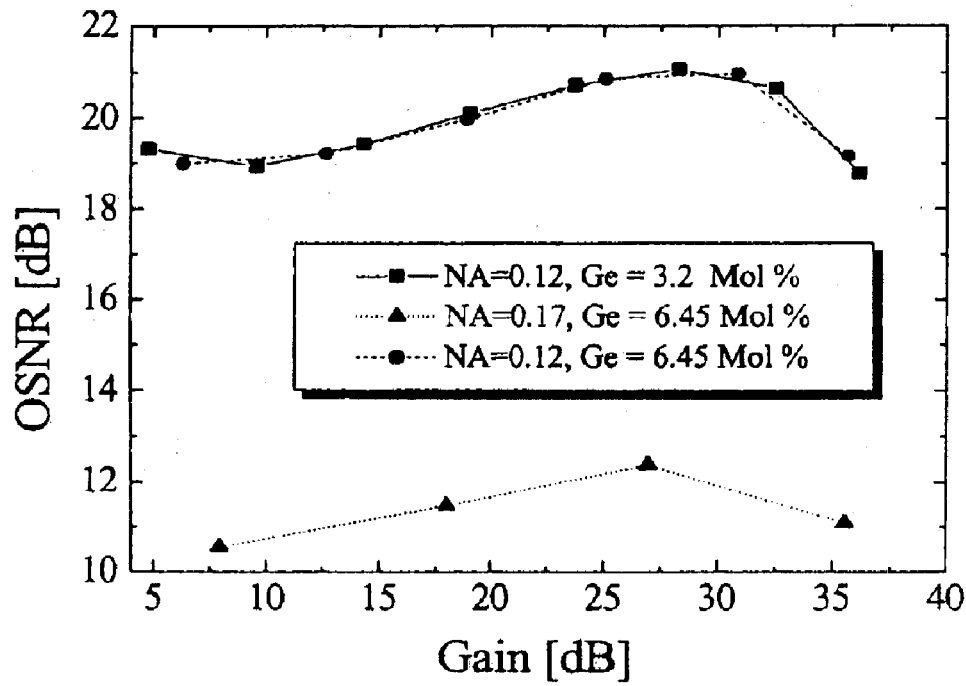

FIG. 4A and FIG. 4B are graphs illustrating results of calculating the optical signal to noise ratio (OSNR) for respective cases of FIG. 1A~FIG. C. FIG. 4A is a graph illustrating the OSNR against the pump power and FIG. 4B is a graph illustrating the OSNR against the Raman on/off gain obtained in FIG. 2. At this time, the OSNR is calculated considering the double Rayleigh back scattering with a noise term. Therefore, it means that higher the value has better characteristic.

Referring now to FIG. 4A, it can be seen that FIG. 1A and FIG. 1C have good characteristics. It can be also known that the OSNR becomes poor in FIG. 1B. This is because the double Rayleigh back scattering value and the ASE (amplified spontaneous emission) level are increased. The ASE level indicates an amplifier noise generating in the optical amplifier, which affects the signal light source since the spontaneous noise is increased within the amplifier.

FIG. 4B shows a graph of the OSNR when the axis of abscissa is the Raman on/off gain. It can be seen that the results of FIG. 1A and FIG. 1C are almost same. In other words, as they show similar OSNRs even when they have the same gains, it can be seen that FIG. 1C can reduce the pump power compared to FIG. 1A.

Figure 5A:
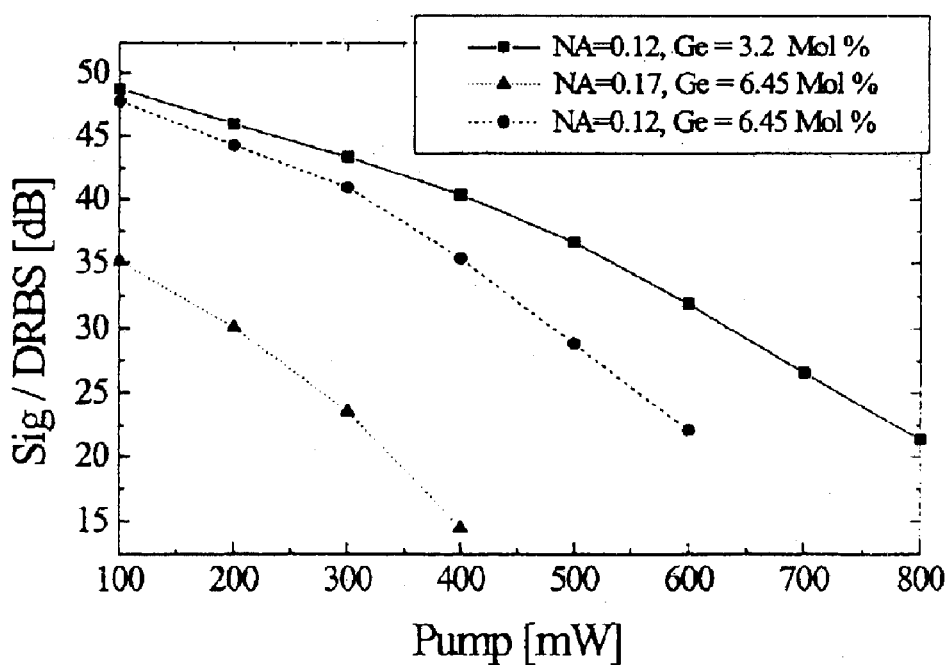
FIG. 5A and FIG. 5B are graphs illustrating results of calculating the signal to double Rayleigh back scattering (DRBS) value for respective cases of FIG. 1A~FIG. 1C.
Figure 5B:
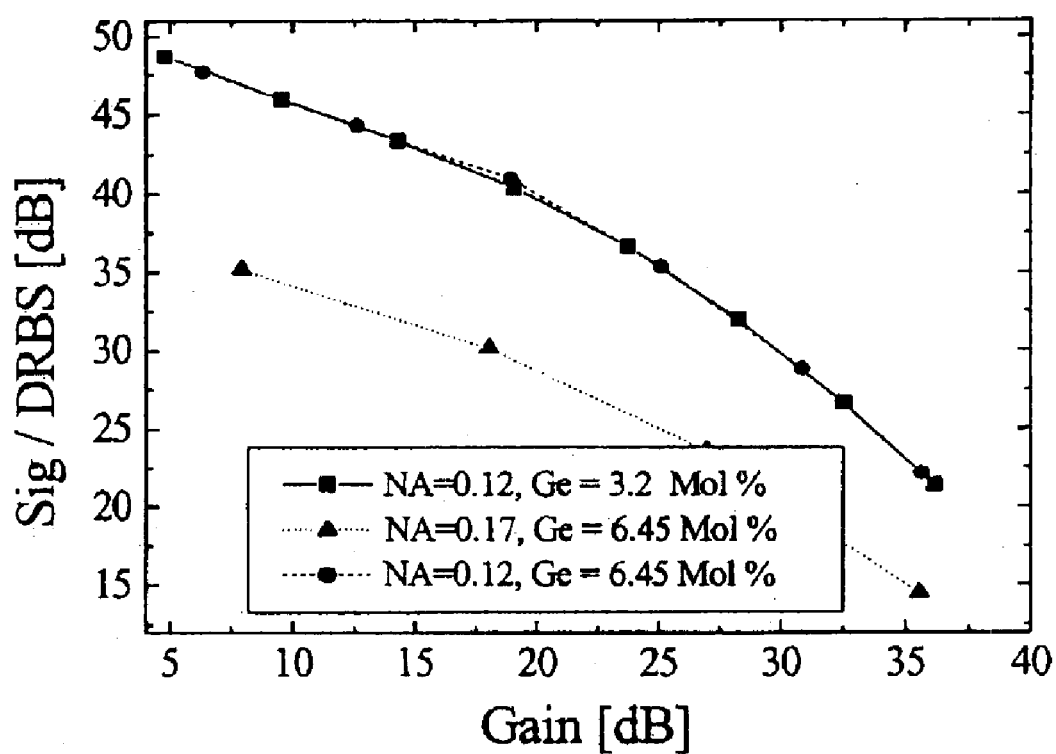

FIG. 5A and FIG. 5B are graphs illustrating results of calculating the signal to double Rayleigh back scattering (DRBS) value for respective cases of FIG. 1A~FIG. 1C. FIG. 5A is a graph illustrating the signal/DRBS for the pump power, and FIG. 5B shows the signal/DRBS for the Raman on/off gain obtained in FIG. 2. At this time, the signal/DRBS means the ratio of the optical signal power against the DRBS. This value indicates how the optical signals against DRBS are amplified well, which is an important parameter in the distributed Raman amplifier.

Referring now to FIG. 5A, it can be seen that FIG. 1B has the worst characteristic and FIG. 1A and FIG. 1C show good characteristics.

Also in FIG. 5B, it can be seen that FIG. 1A and FIG. 1C have a similar value and show a better characteristic in terms of Raman On/Off gain. As described above, FIG. 1A requires more power than FIG. 1C in order to obtain a desired Raman gain. However, it can be seen that the characteristics of other OSNR and signal/DRBS have almost similar values for Raman On/Off gain.

Therefore, FIG. 1C has the same characteristic in the OSNR, the DRBS, or the like but has a high content of $GeO_2$ in the core and the refractive index can maintain a low value by doping fluorine together. Therefore, a high Raman gain can be obtained with a low pump power while maintaining the DRBS of a low value, compared to a case where only simple Ge having the same refractive index is doped.

As mentioned above, according to the present invention, $GeO_2$ is added to the core and the cladding, and F is also doped to control the refractive index. Thus, a high Raman gain coefficient can be obtained while maintaining a desired dispersion value and a low non-linearity. Therefore, the present invention has advantageous effects that it can reduce the pump power of the laser diode, thus reduce the cost of the laser diode and extend the life of the laser diode since the laser diode needs not be operated at high output. Further, the Raman gain coefficient is increased while the refractive index profile, the dispersion value, the loss value, the mode field diameter, the effective area, or the like are maintained intact in the manufacturing specification of the standard single mode optical fiber being a transmission optical fiber usually used in the optical communication system. Therefore, the present invention has an advantage that it can manufacture the transmission optical fiber without significant difference from the existing method.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A transmission optical fiber including a core and a cladding made of silica,
wherein $GeO_2$ of 3.0~10 mol % and F of 0.1~5 mol % are doped together in the core.

2. The transmission optical fiber as claimed in claim 1, further comprising $GeO_2$ and F in the cladding.

3. The transmission optical fiber as claimed in claim 2, wherein the concentration of $GeO_2$ in the core is higher than the concentration of $GeO_2$ in the cladding.

4. The transmission optical fiber as claimed in claim 2, wherein the $GeO_2$ of 3.0~10 mol % and F of 0.1~5 mol % are doped in the core and the $GeO_2$ of 0.1~3 mol % and F of 0.05~1.5 mol % are doped in the cladding.

5. The transmission optical fiber as claimed in claim 2, wherein $GeO_2$ and F are doped in the core and cladding, in a range that the refractive index of the core is increased by 0.003~0.015 and the refractive index of the cladding is increased by 0.0~0.003.

* * * * *